United States Patent [19]

Hassler

[11] Patent Number: 4,691,570

[45] Date of Patent: Sep. 8, 1987

[54] METHOD AND APPARATUS FOR ULTRASONICALLY SCANNING A SUBJECT WITH AN ULTRASOUND HEAD

[76] Inventor: Dietrich Hassler, Flurweg 3, 8525 Uttenreuth, Fed. Rep. of Germany

[21] Appl. No.: 775,313

[22] Filed: Sep. 12, 1985

[51] Int. Cl.$^4$ .............................................. G01N 29/00
[52] U.S. Cl. ..................................... 73/626; 128/660; 367/103
[58] Field of Search ................. 73/625, 626; 128/660; 367/103

[56] References Cited

U.S. PATENT DOCUMENTS

| 4,235,111 | 11/1980 | Hassler | 73/626 |
| 4,481,823 | 11/1984 | Alais | 73/626 |
| 4,604,897 | 8/1986 | Saglio | 73/626 |

FOREIGN PATENT DOCUMENTS

| 0012165 | 6/1980 | European Pat. Off. |
| 3121513 | 12/1982 | Fed. Rep. of Germany |
| 2021767 | 12/1979 | United Kingdom |
| 2041525 | 9/1980 | United Kingdom |
| 2045435 | 10/1980 | United Kingdom |

OTHER PUBLICATIONS

"Matched Gaussian Apodization of Pulsed Acoustic Phased Arrays Duerinckx, Acoustical Imaging., vol. 10, 1980.
"Generalized Shading Formula From A Given Line Shading", Lockhart et al., J. Acoust. Soc. Am 68(4), Oct. 1980.

Primary Examiner—Howard A. Birmiel
Attorney, Agent, or Firm—Hill, Van Santen, Steadman & Simpson

[57] ABSTRACT

A method and apparatus for ultrasonically scanning a subject with an ultrasonic head having a number of side-by-side transducer elements employing an increasing number of ultrasound transducer elements, successively activated, to obtain reception from different depth ranges. The ultrasound aperture is thereby enlarged in steps. The center of gravity of the aperture moves across the ultrasonic transducer elements in the scan direction, with one corner point remaining fixed. During such movement, the directional characteristic of the activated aperture is selected such that a sawtooth scan curves results, substantially approximating a straight line scan. All ultrasonic transducer elements are activated in this manner when scanning a greatest scan depth of the subject. The apparatus includes a channel for each transducer element, each channel including a depth compensation amplifier, a controlled switch device, and a delay device, with each of the channels being connected to a summing element at their outputs.

18 Claims, 4 Drawing Figures

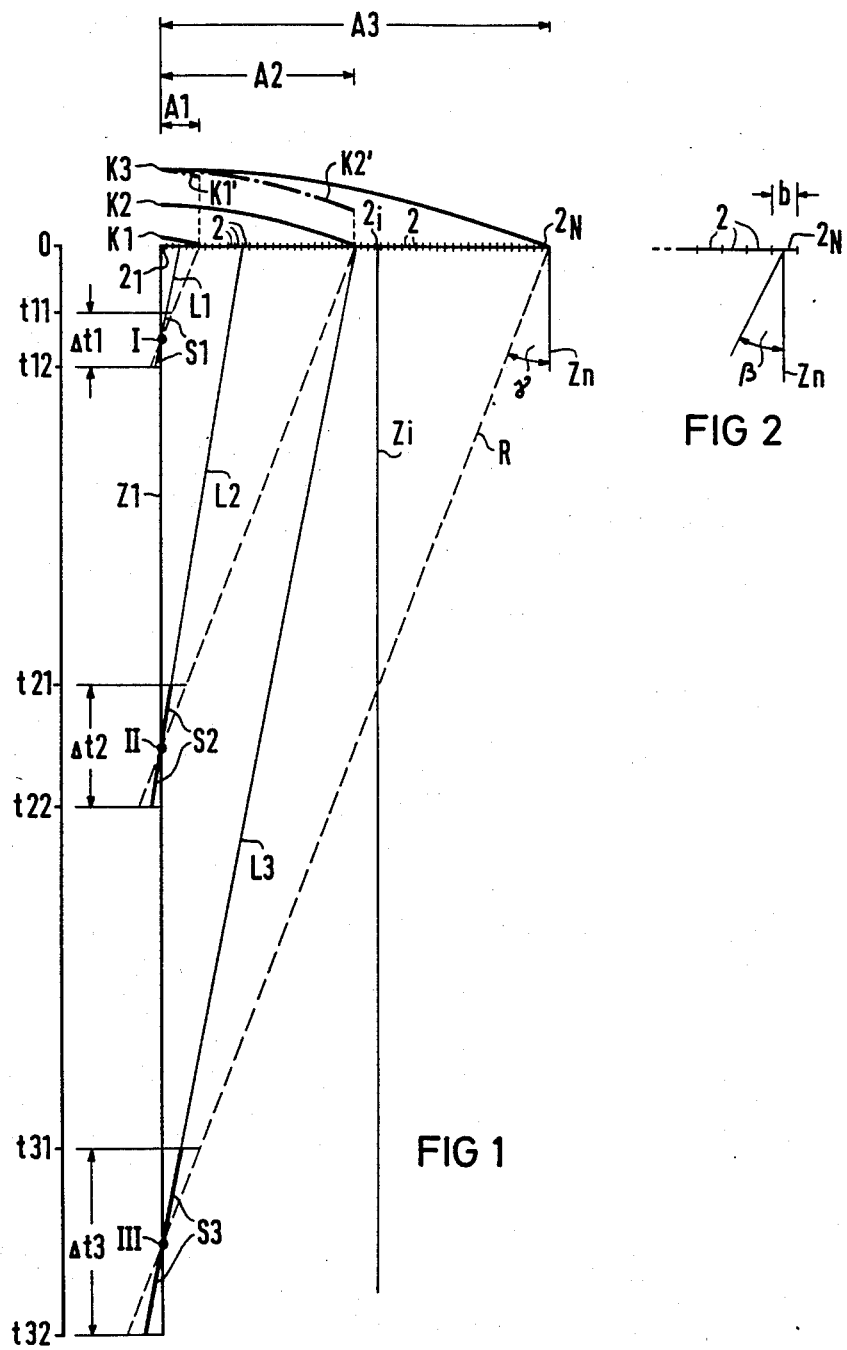

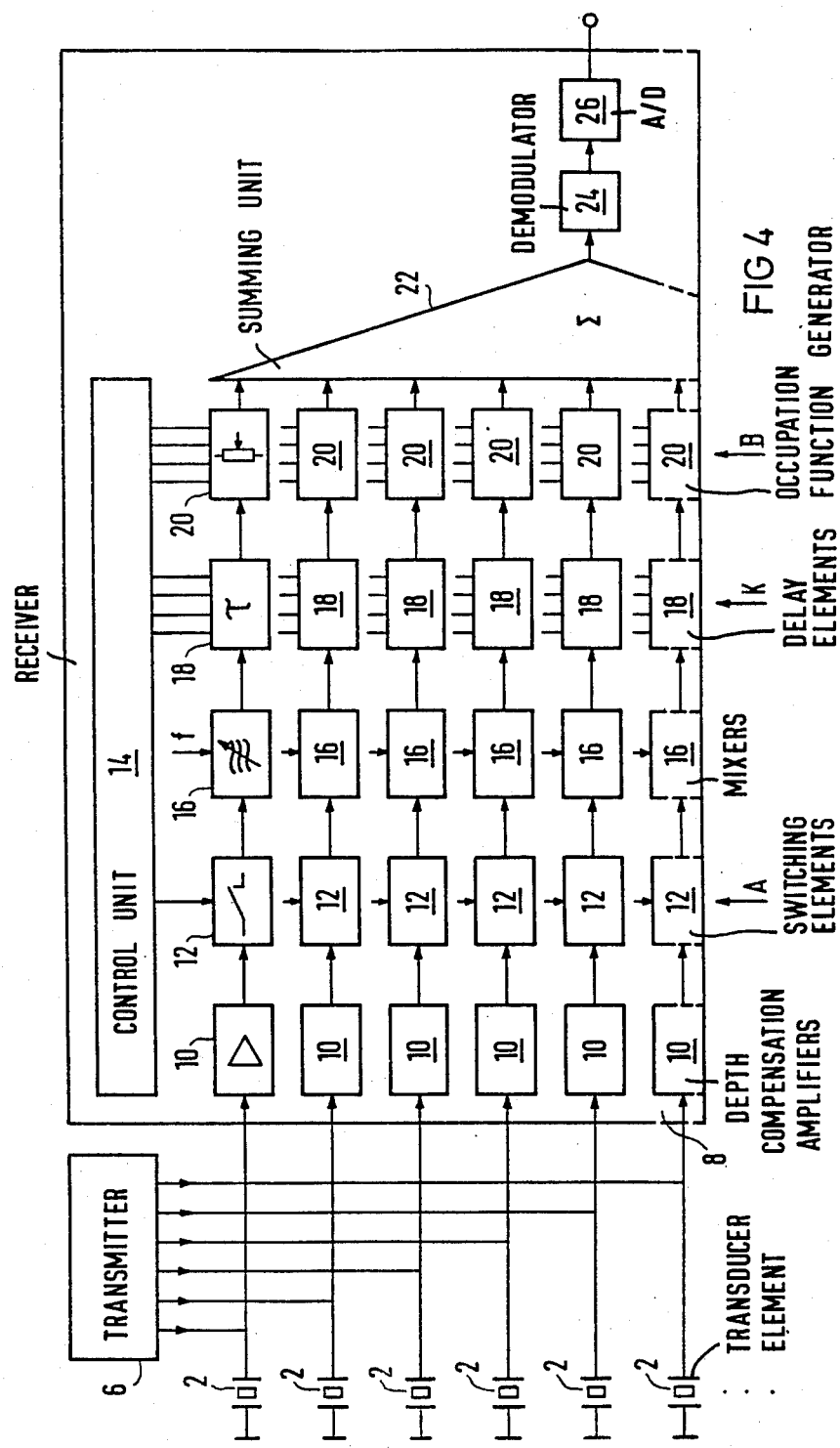

METHOD AND APPARATUS FOR ULTRASONICALLY SCANNING A SUBJECT WITH AN ULTRASOUND HEAD

BACKGROUND OF THE INVENTION

1. Field of the Invention

The present invention relates to a method and apparatus for ultrasonically scanning an object with an ultrasonic head having a plurality of transducer elements disposed side-by-side, wherein different numbers of the transducer elements are successively activated for reception along a straight scan line for receiving echos from different depth regions.

2. Description of the Prior Art

Parallel scanners are traditionally utilized for ultrasonically scanning an examination subject. In such devices, the ultrasonic head has a plurality of ultrasound transducer elements disposed in parallel side-by-side, which are scanned individually or in groups during transmission and during reception. During reception along a scan line, operation can be utilized as described in German OS No. 26 43 918. Electronic focusing is undertaken by activating an increasing number of ultrasonic transducer elements for increasing the scan depth in the examination subject. The so-called aperture by this scanning method, however, is relatively small because only a single element or group of elements from the total number of ultrasonic transducer elements is utilized. The theoretically available maximum transverse resolution based on the applicable physics cannot be achieved.

SUMMARY OF THE INVENTION

It is an object of the present invention to provide a method and apparatus for ultrasonically scanning a subject, in particular for parallel scanning, with improved resolution.

The above object is inventively achieved in a method and apparatus wherein, during reception along a scan line, the ultrasonic aperture is enlarged by moving the center of gravity of the aperture along a straight line in a scanning direction by successively activating ultrasonic transducer elements in an ultrasonic head, while the directional characteristic of the respective aperture is properly adjusted, such that a sawtooth scan curve approximating the straight scan line is generated. In the greatest scan depth of the subject, all ultrasonic transducer elements are operated by switching to receive.

The aforementioned aperture movement is obtained by continuously adding on further ultrasonic transducer elements, beginning from a fixed activated transducer element. The directional characteristic of the aperture can be defined in a known manner, for example, with electronic circuit means, by selectively combining the aperture size, the reception curve (curvature), and the occupation function (shading) of the active reception area.

In this method and apparatus, a specific aperture is allocated to each depth point along a scan line (image line), the aperture being larger than in conventional methods and devices as a consequence of oblique scanning. As is known, resolution in an ultrasonic device becomes better as the size of the aperture increases. The method disclosed herein enables full exploitation of the aperture allocated to a particular depth region, so that improved resolution in the image display is achieved.

Preferably the directional characteristic for the individual aperture stages is selected such that any effective aperture "looks" at the straight scan line at substantially the same angle as the other effective apertures. A substantially constant degree of focusing, i.e., a constant F-number, is thereby obtained for the full scan depth. The resolution is thereby adjustable independent of the depth, i.e., is constant.

In a further embodiment of the invention an aperture occupation function (sometimes referred to as "shading" or "apodization") is allocated to the aperture during reception along a scan line, the aperture occupation function being selected, for example, according to a Gaussian distribution function or, for example, according to a skewed (i.e., unsymmetrical) function, which may nonetheless be Gauss-like. The aperture occupation function is a measure for weighting the received echo signals. Given suitable selection of the aperture occupation function, an ultrasonic image is achieved substantially without sidelobe artifacts.

An apparatus for undertaking ultrasonic scanning in accordance with the above method has an ultrasonic head with a plurality of transducer elements, each transducer element being connected to its own depth compensation amplifier (TGC amplifier), for level standardization, with the output signal of the respective amplifiers being forwarded to a respective switching element connected thereto. The switching elements, under the command of a control device, successively set a number of apertures for each scan line, with each switching element being followed by a component for signal retardation which, also under the command of the control device, set the associated curvature for each aperture. The output signals of the signal retardation components are conducted to a summing element, the output signal of which is converted into an image signal by signal processing components.

DESCRIPTION OF THE DRAWINGS

FIG. 1 is a schematic illustration of a method and apparatus for ultrasonic scanning in accordance with the principles of the present invention.

FIG. 2 is a detail from the illustration of FIG. 1.

FIG. 4 is an apparatus for implementing the method schematically illustrated in FIG. 3.

DESCRIPTION OF THE PREFERRED EMBODIMENTS

Figure 3:
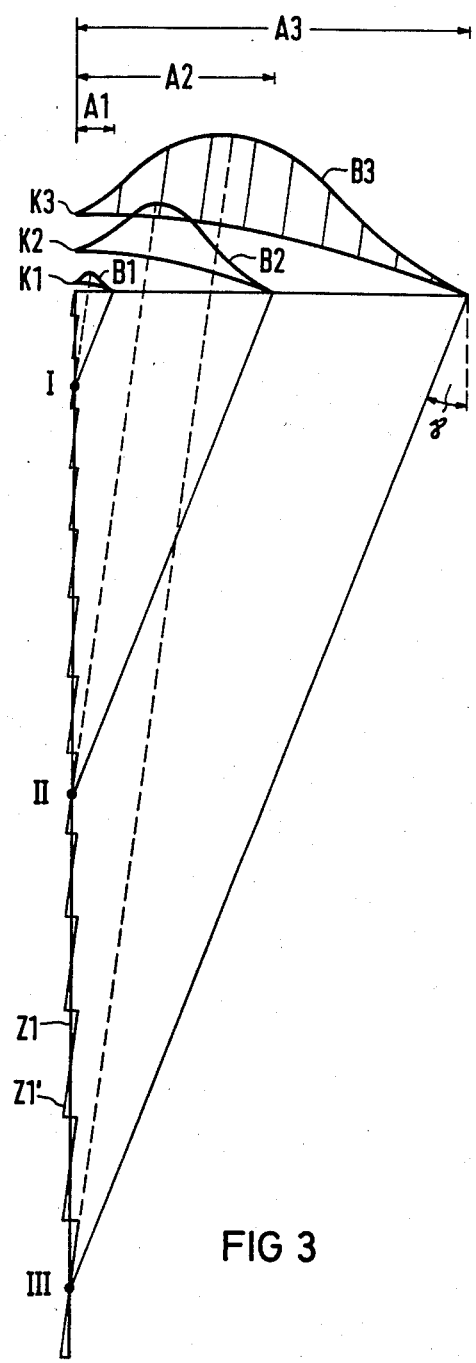
FIG. 3 is a schematic illustration of a further embodiment of the method and apparatus shown in FIG. 1.

As schematically shown in FIG. 1, an ultrasonic head is provided for ultrasonically scanning a subject, the head having a plurality N of ultrasonic transducer elements 2 disposed side-by-side. The array may consist, for example, of $N=2^7=128$ transducer elements 2 disposed in parallel. The ultrasonic transducer elements 2 are thus components of a linear array which may, for example, extend 8 cm in length. As shown in the detailed representation of FIG. 2, the width b of an individual transducer element 2 may be approximately 80 mm/128=0.625 mm. Given an ultrasonic frequency of, for example, 3.5 MHz, this width b is approximately 1.5 times the wavelength. The ultrasonic transducer element of the array at the left end is referenced $2_1$, and the transducer element at the right end is referenced $2_N$, however, it will be understood that the referencing may proceed in the opposite direction for a different scanning direction.

In order to facilitate explanation of the reception method disclosed herein it will be assumed, for example, that in a preceding transmission mode a small aperture, that is, a group having a relatively small number of ultrasonic transducer elements 2, is activated. Beginning at the left of FIG. 1, this group will be moving toward the right. A small excess of transducer elements 2 in comparison to the desired scan width can be present at the left. For any transmit pulse, therefore, only the prescribed group of ultrasonic transducer elements 2 is activated (energized) and this group moves by one step (i.e., one transducer element) toward the right after each transmit pulse and after the reception of the resultant echo signals. It will further be assumed that a transmit pulse is initially beamed along a first scan line or image line Z1. Immediately thereafter, the echo signals obtained from different depth regions of the subject under examination are received by means of selected ultrasonic transducer elements 2 according to the method of the invention along this scan line Z1, and are processed in signal processing components. The first scan or image line Z1 is identical to the margin line at the left of FIG. 1. The scan line then moves or migrates one step toward the right.

During reception along the scan line Z1, increasing apertures and prescribed receive directional characteristics are utilized such that a sawtooth scan curve is obtained which substantially approximates the desired straight scan line Z1. This is shown in FIG. 1 for three arbitrarily selected depth regions. The three depth regions are referenced $\Delta t1$, $\Delta t2$, $\Delta t3$. These depth regions $\Delta t1$, $\Delta t2$ and $\Delta t3$ are actually significantly smaller than shown in FIG. 1 in relation to the full depth region scanned, since it is necessary to adequately cover the points of interest I, II and III within the central portion of the respective depth regions. In contrast to FIG. 1, the individual scanned depth regions will actually immediately follow each other during reception. For greater clarity, however, a discrete representation has been shown in FIG. 1.

A small aperture is used at the beginning of the reception scanning along the scan line Z1. This is indicated by the aperture A1 at the left edge of the ultrasonic head. The aperture A1 includes the left marginal transducer element $2_1$. As can be seen, only relatively few of the transducer elements 2 are activated in the aperture A1. Electrical focusing of the ultrasound device is undertaken by conventional electronic means in accordance with a curvature K1. The curvature K1 is an arc of a circle with the subject point I as its center. The distance of every individual ultrasonic transducer element $2_i$ ($i=1 \ldots N$) from the arc K1 corresponds to the established delay time for the element $2_i$. For scanning the margin line Z1 (at the left), the first ultrasonic transducer element $2_1$ experiences the greatest delay during reception, whereas the elements disposed further toward the right experience increasingly less delay of their receive signals in the following summation, given an increasing distance from the margin element $2_1$. The ultrasound head is thereby focused to the subject point I.

Reception with the curvature K1 is begun when echo signals arrive from the selected depth t11, and reception is terminated when echo signals have arrived from the selected depth t12. The ultrasound head thereby remains focused to the subject point I. This is achieved in a known manner by selecting a suitable directional characteristic. During the on-time, therefore, reception is not undertaken in the direction of the scan line Z1 but is instead undertaken obliquely thereto along the line L1. The region scanned during the on-time is indicated by the oblique path S1 shown with a solid line.

Reception scanning is continued with the depth region adjacent to the region $\Delta t1$. The depth region $\Delta t2$ is shown disposed at a greater distance from the transducer array in FIG. 1. An enlarged aperture A2 is used for scanning the depth region $\Delta t2$, that is, a larger number or group of simultaneously activated ultrasonic transducer elements 2 is employed, with the left-most element $2_1$ again being included. It can be seen that the center of gravity of the active aperture has moved along the array of ultrasonic transducer elements 2 in the scanned direction, i.e., toward the right. A different setting of the time delays for the ultrasonic echo signals received by the activated ultrasonic elements 2 corresponding to the enlarged aperture A2 is employed, the delayed signals then being summed. The different curvature is indicated by the arc K2. The left margin element $2_1$ again experiences the largest time delay, whereas the elements 2 disposed further toward the right in the activated group experience increasingly smaller time delays as the distance from the element $2_1$ increases. The aperture A2 is selected such that the ultrasound array is focused to the more deeply disposed subject point II. In accordance with the above, the aperture A2 is activated as soon as echo signals arrive from a selected depth t21. Reception utilizing the aperture A2 is terminated as soon as echo signals arrive at the activated transducer elements 2 from a selected greater depth t22. As a consequence of the selected directional characteristic, i.e., of the selected time delays assigned to the elements 2 of the group representing the aperture A2, scanning is executed along the oblique line L2 during the activation time, namely only along the limited path S2 which includes the subject point II. The scanning is again undertaken such that instead of scanning along the line Z1, scanning is undertaken obliquely thereto, namely between the depths t21 and t22 along the path S2.

For scanning the subject point III disposed at the greatest depth from the array, all ultrasonic transducer elements $2_1 \ldots 2_N$ are activated. In this case the aperture is referenced A3. For focusing to the subject point III, the echo signals received by the individual activated transducer elements $2_1 \ldots 2_N$ are delayed in accordance with a circular arc having the curvature K3. Focusing is then undertaken along an oblique line L3, of which only the limited path S3 (which includes the subject point III) is actually employed for signal evaluation. Limitation of path S3 is given by the depths t31 and t32, i.e. by a corresponding switching interval.

This step-by-step and oblique scanning is continued without gaps along the entire scanning line Z1 as described above, so that a sawtooth scan curve is obtained, as shown in FIG. 3.

Every aperture A1, A2 and A3 (as well as any others which may be utilized) effective at a particular moment "looks" at the straight-line scan line Z1 at approximately the same angle.

The result of the scan method schematically represented in FIG. 1 is a depth-independent constant resolution. The scan line Z1 is approximated by the sawtooth curve which derives due to the combined selection of the aperture size and the curvature for predetermined time intervals.

The same procedure is followed for a second scan line (not shown) parallel and to the right of the line Z1. After transmission, a sawtooth approximation of the second scan line is also obtained. The procedure is repeated for each scan line $Z_i$ (i=1 ... N).

When the individual depth regions Δt are selected sufficiently small, this being determined by dimensioning of the ultrasonic head both mechanically and electrically, the advantage results that the maximum possible aperture size can be used in every individual scan or image line $Z_i$. This results in an ultrasound image having an exceptionally high resolution.

As also indicated in FIG. 1, the set of curves K1, K2 and K3 can be replaced by a curvature set K1', K2' and K3 whose curves all converge at the left starting point of the curve K3. The curves K1' and K2' are shown dot-dashed. For scan lines other than Z1, the common starting point of the curvatures will also be at the location of the scan line of the array. The curvature set K1', K2' and K3 has the advantage that the apparatus outlay for the delay elements and for conversion of the transit time measurement into coordinate representation becomes smaller.

A marginal ray R for scanning the subject point III is shown in FIG. 1 for the left-most scan or image line Z1. The marginal ray R is inclined by an angle γ relative to the right margin line $Z_n$. Calculations have shown this angle γ may amount to 22° given the aforementioned dimensioning of the ultrasonic head.

Some special considerations with respect to the width of the individual transducer elements 2 are shown in FIG. 2. When an individual element 2, for example the right margin element $2_N$, is considered it is known that the width b thereof must be small in order to suppress "grating lobes". A value of λ/2 is preferable, wherein λ is the wavelength of the ultrasonic energy emitted by that transducer element. Investigations have shown, however, that a value of b=1.5 λ suffices for a parallel scan, with a relatively slight swing. It must also be considered that the self-directional effect of the individual transducer element $2_N$ should be suppressed to such a degree that it is in the position to receive obliquely incident ultrasonic radiation. It has been shown that an intensity drop of approximately 3dB is obtained given an angle β=27° with the above-mentioned dimensions. When sawtooth losses are considered, a width b of 0.45 mm is obtained, this roughly corresponding to a full wavelength. When the intensity drop of the margin element $2_N$ should not amount to more than 3 dB given the angle γ shown in FIG. 1 (which, as mentioned, can amount to 22°), this is guaranteed when the element $2_N$ has a width of approximately 1.0 λ at 3.5 MHz. Given an operating frequency of 4 MHz, an intensity drop of 3 dB is achieved given an element width b=0.4 mm.

A symmetrical antenna without the sawtooth curve shape is obtained at the center line, that is, for a scan line at the location of the element $2_{N/2}$.

In FIG. 3, elements corresponding to those already discussed in connection with FIG. 1 are shown with the same reference symbols. The sawtooth approximation of the straight scan line Z1 is referenced at Z1'. The image line $Z_i$ to be represented also moves one step further in the scan direction, i.e., toward the right after each transmission pulse.

In the embodiment of FIG. 3, the curvatures K1, K2 and K3 associated with each aperture A1, A2 and A3 are individually provided with a selected aperture occupation function B1, B2 and B3, respectively. Such an aperture occupation function is also referred to in the art as "shading" or "apodizing" and causes the echo signals received when scanning a subject point I, II or III by the activated elements 2 to be added with different weighting. The weighting, and thus the form of the aperture occupation function B1, B2 or B3, is dependent on practical requirements for each application. As shown in FIG. 3, the functions can be selected so as to have a slow, quasi-steady transition at both sides. Use of this type of aperture occupation function B1, B2, B3 results in a suppression of side lobes which would otherwise arise due to edge effects given a rectangular occupation function.

As can be further seen in FIG. 3, the occupation functions B1, B2 and B3 for the left-most line Z1 are selected such that an asymmetrical shading results. The center of gravity of the sensitivity lobe does not, therefore, lie in the center of the curvatures K1, K2 or K3, but rather is shifted toward the left. Thus the number of switchings occurring during scanning, as described below, becomes smaller than that which would be the case given symmetrical shading. Other aperture occupation functions can be allocated to other image lines $Z_i$.

As a consequence of the use of different sized apertures, all n=128 ultrasound transducer elements 2 are simultaneously sampled, and are thus always in use, for the maximum scan depth. (The function shown in the embodiment of FIG. 1 may be interpreted as a rectangular, variable aperture function.) Due to the different aperture occupation functions, the signals from the individual transducer elements 2 are differently weighted. Thus, for the apertures A1 and A2, the signals for those elements disposed to the right of the effective aperture are not considered. This can be interpreted as an effect of the aperture selection or of the aperture occupation function.

Given the embodiment shown in FIG. 3, the scan line Z1 is approximated by the sawtooth scan curve Z1', due to selection of the aperture size A, the curvature K and the aperture occupation function B. The same applies for the other scan lines $Z_i$ (i=1 ... N).

Given scanning of the left-most line Z1 a small excess (not shown) of transducer elements 2 may be present at the left edge. This is necessary, under certain conditions, in order to be able to emit perpendicularly in the transmit mode given an aperture that is larger than the width of an individual ultrasonic transducer element.

Given conventional technology comprising a linear array, an array twice as long as that shown in the embodiments of FIGS. 1 and 3 would be required for obtaining the same image field width and the same aperture, that is, at both sides half an array would be required as excess.

The ultrasound array may also be in the form of a multiline array or a planar array consisting of a matrix of ultrasonic transducer elements. The possibility of focusing at right angles relative to the scan direction is then present.

An apparatus for implementing the method described in connection with FIG. 3 is shown schematically in FIG. 4. In this apparatus, for example, a plurality N=128 transducer elements 2 are again provided. These transducer elements 2 are supplied with transmit signals in a conventional manner by a transmitter 6 for operation in the transmit mode. Conventional decoupling elements (not shown) are interconnected between the transmitter 6 and a receiver 8, which is also connected to the transducer elements 2.

The echo signal received by each transducer element 2 is conducted to its own depth compensation or TGC amplifier 10. The individual depth compensation amplifiers 10 assure that, given identical reflection, the echo signals from a greater depth has the same amplitude as a signal from a lesser depth. A form of level standardization is thus achieved, while simultaneously obtaining a type of dynamics constriction. A dynamics range of 50dB suffices for the received echo signals in view of the following components.

The 128 depth compensation amplifiers 10 must function synchronously. This can be achieved, for example, by utilizing correspondingly constructed integrated circuits from the same manufacturing batch. It is also possible to tune all of the depth compensation amplifiers 10 to the same sensitivity before or during use, which can be undertaken automatically.

Each of the output signals from the depth compensation amplifiers 10 is supplied to its own switching device 12. Each of the switching devices 12 is essentially a switch under the command of a control device 14, such as a microprocessor. The switch position of the switching devices 12 determines the size and position of the selected aperture.

The output signals which the switching devices 12 permit to pass are supplied to respectively adjustable components 16 and 18, which are also under the command of the control device 14. The components 16 and 18 are for generating the required curvature K1, K2 or K3 (or K1', K2' and K3). The components 18 may be adjustable delay elements which adjust the curvature K for focusing in every image line $Z_i$. Delay times of 10 $\mu s$ can be obtained only with considerable outlay. In order to nonetheless arrive at acceptable costs, mixing techniques known to those skilled in the art may be utilized. The components 16, therefore, may be mixing elements which admix a frequency f. For example a frequency band of interest such as 2 through 5 MHz can be shifted down by such a mixing technique to a frequency band of 0 through 3 MHz or, given quadrature technology including two channels, down to 0 through 1.5 MHz. The components 16 and 18 may also be selected for effecting a mixing up to higher frequencies, for example to a region around 30 MHz and surface-acoustical elements may then additionally be utilized for setting the delays.

The output signals from the components 18 are supplied to respective occupation function generators 20, which are also under the command of the control device 14. The occupation function generators 20 generate the selected occupation functions as described above. The occupation function generators 20 may be variable resistors wherein the resistance value is modified by the control device 14 based on the measure of an occupation function B for the particular aperture. The occupation function generators 20 generate the sensitivity coating or the "shading". They also block, for example, undesired ultrasonic elements as shown in FIGS. 1 and 3 for the functions B1 and B2 and for the elements 2 positioned on the right hand side. It may then be possible to omit the switching components 12.

The individual echo signals processed in this manner are forwarded from the occupation function generators 20 to a summing unit 22 and are added or superimposed in that unit 22. The superimposed signals from the summing unit 22 are then supplied in a known manner to a demodulator 24, and then to an analog-to-digital converter 26. Further processing may then be undertaken in a conventional manner such that an image signal in a form suitable for supply to an image display or image recording device is obtained.

In a further embodiment, the output signal of the summing unit 22 can be initially supplied to an analog-to-digital converter as a radio frequency signal, from which a rectified signal is acquired which is further processed in a digital low-pass filter. This type of signal processing is also known to those skilled in the art, and has the advantage that a greater dynamic can be achieved.

The method described above can be utilized not only for parallel scanning, but also for trapezoid scanning. The straight line scans may be approximated with a comparatively low number of sawtooth steps in the two edge regions of the trapezoid.

In summary, the entire length of the array in accordance with the principles of the present invention becomes an "active aperture", and instead of simply moving the location of the active aperture as is known in the art, the scanning operation is undertaken by a combination of swing and dislocation of the center of gravity line of the ultrasonic field, or of the reception directional characteristic. Selection of the aperture size results in a depth-independent resolution, that is, a constant F-number, and aperture occupation functions (preferably asymmetrical) suppress disruptive side lobes. Spatial resolution in an array-B scanner can be enhanced in this manner, and at the same time the dependency of the spatial resolution on the depth coordinate is reduced.

Although modifications and changes may be suggested by those skilled in the art it is the intention of the inventor to embody within the patent warranted hereon all changes and modifications as reasonably and properly come within the scope of his contribution to the art.

I claim as my invention:

1. A method for ultrasonically scanning an object at a selected number of different depth regions along a straight scan line in a direction of increasing depth using an ultrasound head having a plurality of ultrasonic transducer elements, wherein a predetermined number of said transducer elements is activated, thereby forming an ultrasound aperture during reception along said scan line, and wherein echo signals received from said object are successively processed, said method, during reception along said scan line, comprising the steps of:

enlarging the ultrasound aperture in steps, thereby moving the center of said aperture in a scan direction from a fixed starting point;

adjusting the directional characteristic of said aperture at each of said steps; and selecting a different depth region at each of said steps, thereby generating a sawtooth scan curve approximating said straight scan line.

2. The method for ultrasonically scanning an object as claimed in claim 1, wherein said echo signals received from said object by said transducer elements in an aperture are subjected to selected delays according to a prescribed curve, thereby adjusting the directional characteristic of said aperture.

3. A method for ultrasonically scanning an object as claimed in claim 1, comprising the additional step of:

weighting echo signals received from said object by said transducer elements in a aperture by different amounts according to a selected weighting function.

4. A method for ultrasonically scanning an object as claimed in claim 3, wherein said weighting function is asymmetrical.

5. A method for ultrasonically scanning an object as claimed in claim 3, wherein said weighting function is an approximately steady function.

6. A method for ultrasonically scanning an object as claimed in claim 1, wherein all said plurality of transducer elements is activated for scanning a greatest scan depth.

7. A method for ultrasonically scanning an object as claimed in claim 6, comprising the additional step of:
  selecting an aperture for obtaining said greatest scan depth such that a straight line from a point at said greatest scan depth to a transducer element in said aperture at a greatest distance therefrom forms an angle less than or equal to 25° from a straight line extending perpendicularly from said aperture to said point.

8. A method for ultrasonically scanning an object as claimed in claim 1, wherein a plurality of sawtooth scan curves is generated, said sawtooth scan curves approximating a plurality of parallel straight scan lines.

9. An apparatus for ultrasonically scanning an object at a selected number of different depth regions along a straight scan line, comprising:
  an ultrasonic head having a plurality of ultrasonic transducer elements for transmitting and receiving ultrasonic energy;
  a plurality of depth compensation amplifiers respectively connected to each of said transducer elements for selectively controlling the signal level of output signals from each of said transducer elements;
  a control unit;
  a plurality of switching elements respectively connected to the outputs of said depth compensation amplifiers and under the command of said control unit, said control unit closing increasingly different numbers of said switching elements during a scan along said scan line for forwarding the outputs of selected ones of said depth compensation amplifiers for further processing, thereby enlarging the ultrasound aperture in steps and moving the center of said aperture in a predetermined scan direction from a fixed starting point;
  means respectively connected to each of said switching elements for selectively delaying the signal received therefrom, said means being connected to said control unit for setting said delay; and
  a summing unit having a plurality of inputs respectively connected to the outputs of said means for delaying for imposing the signals therefrom.

10. An apparatus as claimed in claim 9, further comprising:
  means connected to an output of said summing unit for converting an output signal from said summing unit into an image signal.

11. An apparatus as claimed in claim 9, wherein said means for converting comprises:
  a demodulator having an input connected to said output of said summing unit; and
  an analog-to-digital converter having an input connected to an output of said demodulator.

12. An apparatus as claimed in claim 9, wherein each means for delaying comprises:
  a delay element having control inputs connected to said control unit and having a signal input; and
  a plurality of mixers respectively connected between each of said switching elements and each of said signal inputs of said delay elements and having a frequency input to which a selected frequency is supplied for mixing with the signal received by said mixers from said switching elements.

13. An apparatus as claimed in claim 9, further comprising a plurality of weighting function generators each having a signal input respectively connected to one of said means for delaying and having respective outputs connected to said summing unit and having control inputs connected to said control unit, said weighting function generators assigning a selected weight under the command of said control unit to the signal received at its signal input.

14. An apparatus as claimed in claim 9, wherein said control unit is a microprocessor.

15. An apparatus for ultrasonically scanning an object at a selected number of depth regions along a straight scan line using an ultrasound head having a plurality of ultrasonic transducer elements, comprising:
  means for successively processing echo signals received from said object by increasingly different numbers of said transducer elements for enlarging the ultrasound aperture in steps;
  means for moving the center of said aperture in a scan direction from a fixed starting point, with activation of all of said transducer elements obtaining a greatest scan depth;
  means for selecting different depth regions by sclecting the activation time of said transducer elements; and
  means for delaying said echo signals received from said apertures for generating a sawtooth scan curve approximately said straight line.

16. An apparatus as claimed in claim 15, wherein said transducer elements are disposed in parallel side-by-side relationship, and wherein said scan direction proceeds along said side-by-side transducer elements beginning at a first transducer element.

17. A method for ultrasonically scanning an object at a selected number of different depth regions along each of a plurality of parallel straight scan lines in respective directions of increasing depth using an ultrasound head having a plurality of ultrasonic transducer elements, wherein a predetermined number of said transducer elements is activated, thereby forming an ultrasound aperture during reception along said scan line, and wherein echos received from said object are successively processed, said method, during reception along each of said scan lines, comprising the steps of:
  enlarging the ultrasound aperture in steps by increasing the number of activated transducer elements, thereby moving the center of said aperture in a scan direction from a fixed starting point;
  electronically adjusting the directional characteristic of said aperture at each of said steps; and
  selecting a different depth region at each of said steps, thereby generating a plurality of sawtooth scan curves, said sawtooth scan curves respectively approximating the straight scan lines in said plurality of parallel straight scan lines.

18. A method for ultrasonically scanning an object as claimed in claim 17, comprising the additional step of arranging said ultrasound transducer elements in a linear array with said parallel straight scan lines being disposed perpendicularly to said array.

* * * * *